(12) United States Patent
Asumalahti et al.

(10) Patent No.: US 6,878,784 B1
(45) Date of Patent: Apr. 12, 2005

(54) POLYMER COMPOSITION FOR PIPES

(75) Inventors: Markku Asumalahti, Kerava (FI); Jari Äärilää, Porvoo (FI); Ari Palmroos, Porvoo (FI); Mats Bäckman, Göteborg (SE); Anette Nilsson, Stora Höga (SE); Magnus Palmlöf, Västra Frölunda (SE)

(73) Assignee: Borealis Technology, Porvoo (FI)

( * ) Notice: Subject to any disclaimer, the term of this patent is extended or adjusted under 35 U.S.C. 154(b) by 0 days.

(21) Appl. No.: 09/720,998

(22) PCT Filed: Jul. 1, 1999

(86) PCT No.: PCT/SE99/01195

§ 371 (c)(1),
(2), (4) Date: May 21, 2001

(87) PCT Pub. No.: WO00/01765

PCT Pub. Date: Jan. 13, 2000

(30) Foreign Application Priority Data

Jul. 6, 1998 (SE) .............................. 9802409

(51) Int. Cl.[7] .................................. C08F 2/00
(52) U.S. Cl. .................. 526/64; 526/65; 526/348.4; 526/348.5; 526/348.6; 526/352; 526/901; 526/905; 428/36.9; 428/36.91; 428/36.92
(58) Field of Search .................. 526/64, 65, 348.4, 526/348.6, 348.5, 352, 901, 905; 428/36.9, 36.91, 36.92; 138/DIG. 7

(56) References Cited

U.S. PATENT DOCUMENTS 5,326,835 A * 7/1994 Ahvenainen et al. ......... 526/64
5,494,965 A   2/1996 Harlin et al.
6,403,181 B1 * 6/2002 Barry et al. ............... 428/36.9

FOREIGN PATENT DOCUMENTS

| EP | 0 517 868 B1 | 11/1995 |
| EP | 0 688 794 A1 | 12/1995 |
| EP | 0 949 274 A2 | 10/1999 |
| WO | WO 97/03124 | 1/1997 |

* cited by examiner

Primary Examiner—Robert D. Harlan
(74) Attorney, Agent, or Firm—Merchant & Gould P.C.

(57) ABSTRACT

A multimodal polymer composition for pipes is disclosed. The polymer is a multimodal polyethylene with a density of 0.930–0.965 g/cm$^3$, an MFR$_5$ of 0.2–1.2 g/10 min, an M$_n$ of 8000–15000, an M$_w$ of 180–330×10$^3$, and an M$_w$/M$_n$ of 20–35, said multimodal polyethylene comprising a low molecular weight (LMW) ethylene homopolymer fraction and a high molecular weight (HMW) ethylene copolymer fraction, said HMW fraction having a lower molecular weight limit of 3500, and a weight ratio of the LMW fraction to the HMW fraction of (35–55):(65:45).

16 Claims, No Drawings

POLYMER COMPOSITION FOR PIPES

FIELD OF THE INVENTION

The present invention relates to a multimodal polymer composition for pipes and a pipe prepared thereof.

BACKGROUND OF THE INVENTION

Nowadays, pipes of polymer material are frequently used for various purposes, such as fluid transport, i.e. transport of liquid or gas, e.g. water or natural gas, during which the fluid can be pressurised. Moreover, the transported fluid may have varying temperatures, usually within the temperature range from about 0° C. to about 50° C. Such pressure pipes are preferably made of polyolefin plastic, usually unimodal ethylene plastic such as medium density polyethylene (MDPE; density: 0.930–0.942 g/cm$^3$) and high density polyethylene (HDPE; density: 0.945–0.965 g/cm$^3$). By the expression "pressure pipe" herein is meant a pipe which, when used, is subjected to a positive pressure, i.e. the pressure inside the pipe is higher than the pressure outside the pipe.

Polymer pipes are generally manufactured by extrusion, or, to a smaller extent, by injection moulding. A conventional plant for extrusion of polymer pipes comprises an extruder, a nozzle, a calibrating device, cooling equipment, a pulling device, and a device for cutting or for coiling-up the pipe.

The properties of such conventional polymer pipes are sufficient for many purposes, although enhanced properties may be desired, for instance in applications requiring high pressure resistance, i.e. pipes that are subjected to an internal fluid pressure for a long and/or short period of time. As examples of properties which it is desirable to improve may be mentioned the processability, the impact strength, the modulus of elasticity, the rapid crack propagation resistance, the slow crack growth resistance, and the design stress rating of the pipe.

SUMMARY OF THE INVENTION

It has now been discovered that a superior pressure pipe may be obtained by preparing it from a specific, well defined type of multimodal polyethylene. More particularly, the multimodal polyethylene should have a medium to high density, have a broad molecular weight distribution, a carefully selected ratio between its low molecular weight fraction and high molecular weight fraction, and include a comonomer in its high molecular weight fraction only.

Thus, the present invention provides a multimodal polyethylene composition for pipes, which multimodal polyethylene has a density of 0.930–0.965 g/cm$^3$ and an MFR$_5$ of 0.2–1.2 g/10 min, characterised in that the multimodal polyethylene has an M$_n$ of 8000–15000, an M$_w$ of 180–330×10$^3$, and an M$_w$/M$_n$ of 20–35, said multimodal polyethylene comprising a low molecular weight (LMW) ethylene homopolymer fraction and a high molecular weight (HMW) ethylene copolymer fraction, said HMW fraction having a lower molecular weight limit of 3500, and a weight ratio of the LMW fraction to the HMW fraction of (35–55): (65–45).

Other distinguishing features and advantages of the invention will appear from the following specification and the appended claims.

DETAILED DESCRIPTION OF THE INVENTION

As stated above, the pressure pipe composition of the present invention is made from a multimodal polyethylene. This is in contrast to prior art polyethylene pipes which usually are made of unimodal polyethylene.

The "modality" of a polymer refers to the form of its molecular weight distribution curve, i.e. the appearance of the graph of the polymer weight fraction as function of its molecular weight. If the polymer is produced in a sequential step process, utilizing reactors coupled in series and using different conditions in each reactor, the different fractions produced in the different reactors will each have their own molecular weight distribution. When the molecular weight distribution curves from these fractions are superimposed into the molecular weight distribution curve for the total resulting polymer product, that curve will show two or more maxima or at least be distinctly broadened in comparison with the curves for the individual fractions. Such a polymer product, produced in two or more serial steps, is called bimodal or multimodal depending on the number of steps. In the following all polymers thus produced in two or more sequential steps are called "multimodal". It is to be noted here that also the chemical compositions of the different fractions may be different. Thus one or more fractions may consist of an ethylene copolymer, while one or more others may consist of ethylene homopolymer.

By properly selecting the different polymer fractions and the proportions thereof in the multimodal polyethylene a pipe with inter alia enhanced process-ability can be obtained.

The pressure pipe composition of the present invention is a multimodal polyethylene, preferably a bimodal polyethylene. The multimodal polyethylene comprises a low molecular weight (LMW) ethylene homopolymer fraction and a high molecular weight (HMW) ethylene copolymer fraction. Depending on whether the multimodal polyethylene is bimodal or has a higher modality the LMW and HMW fractions may comprise only one fraction each or include sub-fractions, i.e. the LMW may comprise two or more LMW sub-fractions and similarly the HMW fraction may comprise two or more HMW sub-fractions. It is a characterising feature of the present invention that the LMW fraction is an ethylene homopolymer and that the HMW fraction is an ethylene copolymer, i.e. it is only the HMW fraction that includes a comonomer. As a matter of definition, the expression "ethylene homopolymer" used herein relates to an ethylene polymer that consists substantially, i.e. to at least 97% by weight, preferably at least 99% by weight, more preferably at least 99.5% by weight, and most preferably at least 99.8% by weight of ethylene and thus is an HD ethylene polymer which preferably only includes ethylene monomer units. Moreover, the lower limit of the molecular weight range of the HMW fraction is 3 500, preferably 4000. This means that almost all ethylene copolymer molecules in the multimodal polyethylene pipe composition of the invention have a molecular weight of at least 3500, preferably at least 4000. The reason for this is that the presence of comonomer in the LMW fraction gives a pressure pipe with poor strength.

In the present invention it is further important that the proportions of the LMW and HMW fractions (also known as the "split" between the fractions) are selected properly. More particularly, the weight ratio of the LMW fraction to the HMW fraction should lie in the range (35–55):(65–45), preferably (43–51):(57–49), most preferably (43–48):(57–52). It is important that the split lies within these ranges, because if the proportion of the HMW fraction becomes too great it results in too low strength values and if it is too low it results in an unacceptable formation of gels.

The molecular weight distribution, as defined by the ratio of the weight average molecular weight (M$_w$) to the number average molecular weight ($M_n$), i.e. $M_w/M_n$, of the multimodal polyethylene is rather broad at the present invention and has a value of 20–35, preferably 22–30. The reason for this is to obtain a pressure pipe with a desired combination of good processability and good strength. Further, the number average molecular weight, $M_n$, has a value of 8 000–15 000, preferably 9 000–14 000, while the weight average molecular weight, $M_w$, has a value of 180–330×10³, preferably 200–320×10³ (180–260×10³, preferably 200–250×10³, for an MD pipe material and 250–330×10³, preferably 280–320×10³, for an HD pipe material).

The melt flow rate (MFR), which is equivalent to the term "melt index" previously used, is another important property of the multimodal polyethylene for pipes according to the invention. The MFR is determined according to ISO 1133 and is indicated in g/10 min. The MFR is an indication of the flowability, and hence the process-ability, of the polymer. The higher the melt flow rate, the lower the viscosity of the polymer. The MFR is determined at different loadings such as 2.1 kg ($MFR_{2.1}$; ISO 1133, condition D) or 5 kg ($MFR_5$; ISO 1133, condition T). At the present invention the multimodal polyethylene has an $MFR_5$ of 0.2–1.2 g/10 min, preferably 0.3–1.0 g/10 min.

Another characterising feature of the present invention is the density of the multimodal polyethylene. For reasons of strength the density lies in the medium to high density range, more particularly in the range 0.930–0.965 g/cm³. Preferably, lower densities of 0.937–0.942 g/cm³ are used for smaller diameter MD pressure pipes, while higher densities of 0.943–0.955 g/cm³ are used for larger diameter HD pressure pipes. The pressure pipes of medium density multimodal polyethylene are some-what more flexible than pressure pipes of high density multimodal polyethylene and may therefore more easily be coiled into a roll. On the other hand it is possible to obtain pressure pipes of a higher design stress rating with high density multimodal polyethylene than with medium density multimodal polyethylene.

It should be noted that the multimodal polymer composition of the present invention is characterised, not by any single one of the above defined features, but by the combination of all the features defined in claim 1. By this unique combination of features it is possible to obtain pressure pipes of superior performance, particularly with regard to processability, rapid crack propagation (RCP) resistance, design stress rating, impact strength, and slow crack growth resistance.

The processability of a pipe (or rather the polymer thereof) may be determined in terms of the number of screw revolutions per minute (rpm) of an extruder for a predetermined output of pipe in kg/h, but also the surface appearance of the pipe is then important.

The rapid crack propagation (RCP) resistance of a pipe may be determined according to a method called the S4 test (Small Scale Steady State), which has been developed at Imperial College, London, and which is decribed in ISO DIS 13477. According to the RCP-S4 test a pipe is diameters. The outer diameter of the pipe is about 110 mm or greater and its wall thickness about 10 mm or greater. When determining the RCP properties of a pipe in connection with the present invention, the outer diameter and the wall thickness have been selected to be 110 mm and 10 mm, respectively. While the exterior of the pipe is at ambient pressure (atmospheric pressure), the pipe is pressurised internally, and the internal pressure in the pipe is kept constant at a pressure of 0.5 MPa positive pressure. The pipe and the equipment surrounding it are thermostatted to a predetermined temperature. A number of discs have been mounted on a shaft inside the pipe to prevent decompression during the tests. A knife projectile is shot, with well-defined forms, towards the pipe close to its one end in the so-called initiating zone in order to start a rapidly running axial crack. The initiating zone is provided with an abutment for avoiding unnecessary deformation of the pipe. The test equipment is adjusted in such a manner that crack initiation takes place in the material involved, and a number of tests are effected at varying temperatures. The axial crack length in the measuring zone, having a total length of 4.5 diameters, is measured for each test and is plotted against the set test temperature. If the crack length exceeds 4 diameters, the crack is assessed to propagate. If the pipe passes the test at a given temperature, the temperature is lowered successively until a temperature is reached, at which the pipe no longer passes the test, but the crack propagation exceeds 4 times the pipe diameter. The critical temperature ($T_{crit}$) i.e. the ductile brittle transition temperature as measured according to ISO DIS 13477 is the lowest temperature at which the pipe passes the test. The lower the critical temperature the better, since it results in an extension of the applicability of the pipe. It is desirable for the critical temperature to be around −5° C. or lower. A pressure pipe made of the multimodal polymer composition according to the present invention preferably has an RCP-S4 value of −1° C. (minimum requirement for an MD PE80 pipe) or lower, more preferably −4° C. (minimum requirement for an HD PE80 pipe) or lower, and most preferably −7° C. (minimum requirement for an HD PE100 pipe) or lower.

The design stress rating is the circumferential stress a pipe is designed to withstand for 50 years without failure and is determined for different temperatures in terms of the Minimum Required Strength (MRS) according to ISO/TR 9080. Thus, MRS8.0 means that the pipe is a pipe withstanding an internal pressure of 8.0 MPa gauge for 50 years at 20° C., and similarly MRS10.0 means that the pipe withstands an internal pressure of 10 MPa gauge for 50 years at 20° C. A pressure pipe made of the multimodal polymer composition according to the present invention preferably has a design stress rating of at least MRS8.0, and most preferably MRS10.0.

The impact strength is determined as Charpy Impact Strength according to ISO 179. A pressure pipe made of the multimodal polymer composition according to the present invention preferably has an impact resistance at 0° C. of at least 10 kJ/m², more preferably at least 14 kJ/m², and most preferably at least 15 kJ/m².

The slow crack propagation resistance is determined according to ISO 13479:1997 in terms of the number of hours the pipe withstands a certain pressure at a certain temperature before failure. A pressure pipe made of the multimodal polymer composition according to the present invention preferably has a slow crack propagation resistance of at least 1000 hrs at 4.0 MPa/80° C., and more preferably at least 500 hrs at 4.6 MPa/80° C.

The modulus of elasticity is determined according to ISO 527-2/1B. A pressure pipe made of the multimodal polymer composition according to the present invention preferably has a modulus of elasticity of at least 800 MPa, more preferably at least 950 MPa, and most preferably at least 1100 MPa.

A pressure pipe made of the multimodal polymer composition of the present invention is prepared in a conventional manner, preferably by extrusion in an extruder. This is a technique well known to the skilled person an no further particulars should therefore be necessary here concerning this aspect.

It is previously known to produce multimodal, in particular bimodal, olefin polymers, such as multimodal polyethylene, in two or more reactors connected in series. As instance of this prior art, mention may be made of EP 517 868, which is hereby incorporated by way of reference as regards the production of multimodal polymers.

According to the present invention, the main polymerisation stages are preferably carried out as a combination of slurry polymerisation/gas-phase polymerisation. The slurry polymerisation is preferably performed in a so-called loop reactor. The use of slurry polymerisation in a stirred-tank reactor is not preferred in the present invention, since such a method is not sufficiently flexible for the production of the inventive composition and involves solubility problems. In order to produce the inventive composition of improved properties, a flexible method is required. For this reason, it is preferred that the composition is produced in two main polymerisation stages in a combination of loop reactor/gas-phase reactor. Optionally and advantageously, the main polymerisation stages may be preceded by a prepolymerisation, in which case up to 20% by weight, preferably 1–10% by weight, more preferably 1–5% by weight, of the total amount of polymers is produced. The prepolymer is preferably an ethylene homopolymer (HDPE). At the prepolymerisation all of the catalyst is preferably charged into a loop reactor and the prepolymerisation is performed as a slurry polymerisation. Such a prepolymerisation leads to less fine particles being produced in the following reactors and to a more homogeneous product being obtained in the end. Generally, this technique results in a multimodal polymer mixture through polymerisation with the aid of a Ziegler-Natta or metallocene catalyst in several successive polymerisation reactors. Chromium catalysts are not preferred in connection with the present invention because of the high degree of unsaturation they confer to the polymer. In the production of, say, a bimodal polyethylene, which according to the invention is the preferred polymer, a first ethylene polymer is produced in a first reactor under certain conditions with respect to hydrogen-gas pressure, temperature, pressure, and so forth. After the polymerisation in the first reactor, the reaction mixture including the polymer produced is fed to a second reactor, where further polymerisation takes place under other conditions. Usually, a first polymer of high melt flow rate (low molecular weight, LMW) and with no addition of comonomer is produced in the first reactor, whereas a second polymer of low melt flow rate (high molecular weight, HMW) and with addition of comonomer is produced in the second reactor. As comonomer of the HMW fraction various alpha-olefins with 4–8 carbon atoms may be used, but the co-monomer is preferably selected from the group consisting of 1-butene, 1-hexene, 4-methyl-1-pentene, and 1-octene. The amount of comonomer is preferably such that it comprises 0.4–3.5 mol %, more preferably 0.7–2.5 molt of the multimodal polyethylene. The resulting end product consists of an intimate mixture of the polymers from the two reactors, the different molecular-weight-distribution curves of these polymers together forming a molecular-weight-distribution curve having a broad maximum or two maxima, i.e. the end product is a bimodal polymer mixture. Since multimodal, and especially bimodal, ethylene polymers, and the production thereof belong to the prior art, no detailed description is called for here, but reference is had to the above mentioned EP 517 868.

As hinted above, it is preferred that the multimodal polyethylene composition according to the invention is a bimodal polymer mixture. It is also preferred that this bimodal polymer mixture has been produced by polymerisation as above under different polymerisation conditions in two or more polymerisation reactors connected in series. Owing to the flexibility with respect to reaction conditions thus obtained, it is most preferred that the polymerisation is carried out in a loop reactor/a gas-phase reactor. Preferably, the polymerisation conditions in the preferred two-stage method are so chosen that a comparatively low-molecular polymer having no content of comonomer is produced in one stage, preferably the first stage, owing to a high content of chain-transfer agent (hydrogen gas), whereas a high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 92–98° C., more preferably about 95° C., and the temperature in the gas-phase reactor preferably is 75–90° C., more preferably 80–85° C.

A chain-transfer agent, preferably hydrogen, is added as required to the reactors, and preferably 350–450 moles of $H_2$/kmoles of ethylene are added to the reactor producing the LMW fraction and 20–40 moles of $H_2$/kmoles of ethylene are added to the reactor producing the HMW fraction.

As indicated earlier, the catalyst for polymerising the multimodal polyethylene of the invention preferably is a Ziegler-Natta type catalyst. Particularly preferred are catalysts with a high overall activity as well as a good activity balance over a wide range of hydrogen partial pressures. As an example hereof may be mentioned the catalysts disclosed in EP 688794 and in FI 980788. Such catalysts also have the advantage that the catalyst (procatalyst and cocatalyst) only needs to and, indeed, only should be added in the first polymerisation reactor.

Although the invention has been described above with reference to a specified multimodal polyethylene, it should be understood that this multimodal polyethylene may include various additives such as fillers, etc. as is known and conventional in the art. Further, the pipe made of the specified multimodal polyethylene may be a single-layer pipe or form part of a multilayer pipe including further layers of other pipe materials.

Having thus described the present invention it will now be illustrated by way of non-limiting examples of preferred embodiments in order to further facilitate the understanding of the invention.

EXAMPLE 1

A pipe resin was produced by means of a three-step process in a prepolymerisation loop-reactor followed by first a loop-reactor and then a gas phase-reactor. The split was 2:42:56. No comonomer was used in the two consecutive loop-reactors, while 1-butene was used as comonomer in the HMW-fraction produced in the gas phase-reactor in an amount such that the 1-butene comonomer content of the total resulting polymer was 2.6% by weight. A Ziegler Natta type catalyst as disclosed in EP 688 794 was used. The Mn Of the final polymer was found to be 8500 and the Mw 200000. Mw/Mn thus was 23.5. The density was 941 kg/m³ (ISO 1183 D) and $MFR_5$ was 0.65 g/10 min. (ISO 1133, condition T). The processability was measured using a Battenfeldt 1-90-30B extruder, which gave an output of 730 kg/h at a screw speed of 158 rpm. The extruder head temperature was 220° C. and the die temperature was 210° C. Under the same conditions a conventional unimodal polyethylene pipe resin (MDPE with a density of 940 kg/m$^3$ and an MFR$_5$ of 0,85 g/10 min) gave an output of 690 kg/h. Physical test values were as follows:

| | |
|---|---|
| E-modulus (ISO 527-2/1B) | 840 MPa |
| Impact strength at 0° C. (ISO 179) | 16 kJ/m$^2$ |
| Pressure test on unnotched 32 mm pipe (ISO 1167) | >5000 h at 10.0 MPa/20° C. |
| | >1000 h at 4.6 MPa/80° C. |
| | >5000 h at 4.0 MPa/80° C. |
| Pressure test on notched 110 mm pipe (ISO 13479) | >5000 h at 4.0 MPa/80° C. |
| RCP-resistance in the S4-test on 110 mm pipe | $T_{crit}$ = −4° C. |

EXAMPLE 2

A pipe resin was produced using the same reactor configuration as used in example 1. The split was 1:45:54. No comonomer was used in the two consecutive loop reactors, while 1-butene was used in the HMW-fraction produced in the gas phase reactor in an amount such that the 1-butene comonomer content of the total resulting polymer was 1.3% by weight. The same catalyst type was used as in example 1. The $M_n$ of the final polymer was found to be 10500 and the $M_w$ 285000. $M_w/M_n$ thus was 27. The density was 959 kg/m$^3$ and MFR$_5$ was 0,35 g/10 min.
Physical test values were as follows:

| | |
|---|---|
| E-modulus (ISO 527-2/1B) | 1135 MPa |
| Impact strength at 0° C. (ISO 179) | 13.7 kJ/m$^2$ |
| Pressure test on unnotched 110 mm pipe (ISO 1167) | 594 h at 12.4 MPa/20° C. |
| | >10000 h at 5.0 MPa/80° C. |
| Pressure test on notched 110 mm pipe (ISO 13479) | 1500 h at 4.6 MPa/80° C. |
| RCP-resistance in the S4-test on 110 mm pipe | $T_{crit}$ = −7° C.; $P_{crit}$ > 10 bar |

What is claimed is:

1. A multimodal polethylene composition for pipes, which multimodal polyethylene has a density of 0.930–0.965 g/cm$^3$ and an MFR$_5$ of 0.2–1.2 g/10 min, chacterised in that the multimodal polyethylene has an $M_n$ of 8000–15000, an $M_w$ of 180–330×10$^3$, and an $M_w/M_n$ of 20–35, said multimodal polyethylene comprising a low molecular weight (LMW) ethylene homopolymer fraction polymerized in the presence of a Ziegler Natta catalyst and with the addition of 350–450 moles of H$_2$/kmoles of ethylene and a high molecular weight (HMW) ethylene copolymer fraction polymerized in the presence of a Ziegler Natta catalyst said HMW fraction having a lower molecular weight limit of 3500, and a weight ratio of the LMW fraction to the HMW faction of (35–55):(65–45).

2. A multimodal polymer composition as claimed in claim 1, wherein the multimodal polymer is a bimodal polyethylene produced by (co)polymerisation in at least two steps.

3. A multimodal polymer composition as claimed in claim 1, wherein the ethylene copolymer of the HMW fraction is a copolymer of ethylene and a comonomer selected from the group consisting of 1-butene, 1-hexene, 4-methyl-1-pentene, and 1-octene.

4. A multimodal polymer composition as claimed in claim 1, wherein the amount of comonomer is 0.43.5 mol % of the multimodal polymer.

5. A multimodal polymer composition according to claim 1, having a weight ratio of the LMW fraction to the HMW fraction of (43–51):(57–49).

6. A multimodal polymer composition as claimed in claim 1, wherein the multimodal polymer has an MFR$_5$ of 0.3–1.0 g/10 min.

7. A multimodal polymer composition as claimed in claim 1, wherein the polymer is obtained by slurry polymerisation in a loop reactor of a LMW ethylene homoplymer fraction, followed by gas-phase polymerisation of a MW ethylene copolymer fraction.

8. A multimodal polymer composition as claimed in claim 7, wherein the slurry polymerisation is preceded by a prepolymerisation step.

9. A multimodal polymer composition as claimed in claim 8, wherein the polymer is obtained by prepolymerisation in a loop reactor, followed by slurry polymerisation in a loop reactor of a LMW ethylene homopolymer fraction, and gas-phase polymerisation of a HMW ethylene copolymer fraction.

10. A multimodal polymer composition as claimed in claim 7, wherein polymerisation procatalyst and cocatalyst are added to the first polymerisation reactor only.

11. A pipe characterised in that it is a pressure pipe comprising the multimodal polymer composition according to claim 1, which pipe withstands a pressure of 8.0 MPa gauge during 50 years at 20° C. (MRS8.0).

12. A pipe as claimed in claim 11, wherein the pipe is a pressure pipe withstanding a pressure of 10 MPa gauge during 50 years at 20° C. (MRS10.0).

13. A pipe as claimed in claim 11, wherein the pipe has a rapid crack propagation (RCP)S4-value of −1° C. or lower.

14. A pipe as claimed in claim 13, wherein the pipe has a rapid crack propagation (RCP)S4-value of −7° C. of lower.

15. A multimodal polymer composition as claimed in claim 8, wherein polymerisation procatalyst and cocatalyst are added to the first polymerisation reactor only.

16. A multimodal polymer composition as claimed in claim 9, wherein polymerisation procatalyst and cocatalyst are added to the first polymerisation reactor only.

* * * * *

UNITED STATES PATENT AND TRADEMARK OFFICE
CERTIFICATE OF CORRECTION

PATENT NO.     : 6,878,784 B1
DATED          : April 12, 2005
INVENTOR(S)    : Asumalahti et al.

It is certified that error appears in the above-identified patent and that said Letters Patent is hereby corrected as shown below:

Title page,
Item [73], Assignee, "Borealis Technology," should read -- Borealis Technology Oy, --.

Column 8,
Line 20, "of a MW ethylene" should read -- of a HMW ethylene --.

Signed and Sealed this

Sixth Day of December, 2005

JON W. DUDAS
*Director of the United States Patent and Trademark Office*